Sept. 10, 1935. P. L. HEMP Re. 19,696

MASSAGING DEVICE

Original Filed Nov. 5, 1930

INVENTOR
PAUL L. HEMP
BY
Reif & Braddock
ATTORNEYS

Reissued Sept. 10, 1935

Re. 19,696

UNITED STATES PATENT OFFICE 19,696

MASSAGING DEVICE

Paul L. Hemp, Rochester, Minn., assignor to The Conley Company, Inc., Rochester, Minn., a corporation of Minnesota Original No. 1,886,544, dated November 8, 1932, Serial No. 493,526, November 5, 1930. Application for reissue May 2, 1934, Serial No. 723,606

5 Claims. (Cl. 128—59)

This invention relates to a device for massaging and exercising the skin and flesh of the human body.

The general object of the invention is to provide a device including surfaces adapted to be applied to a person's skin and rolled thereover in such manner as to knead the skin and flesh, by at times performing pinching or contracting actions and at times performing spreading or expanding actions thereon, according to the intention of the masseur which actions can be varied in intensity by varying the position of the device.

More specifically, the invention has for an object to provide a massaging and exercising device including oppositely disposed, substantially spherical surfaces which are mounted for rotation upon axes fixed relatively to each other and which are adapted to be pressed against and rolled over the skin in a manner to cause portions of said spherical surfaces to engage the skin at locations in advance of the axes of said spherical surfaces as they move along to perform pinching or contracting actions upon the skin and the flesh therebeneath, and to cause portions of said spherical surfaces to engage the skin at locations at the rear of said axes of the spherical surfaces as they move along to perform spreading or expanding actions upon the skin and the flesh therebeneath.

A further object is to provide a device as just stated, which can be worked to and fro over the skin with portions of the spherical surfaces either in advance of or at the rear of the axes for said spherical surfaces engaged with the skin, as may be intentional, whereby to knead the skin and flesh.

A further specific object is to provide a massaging and exercising device of the present character, wherein the before mentioned spherical surfaces constitute parts of resilient, preferably rubber or suitable rubber composition, balls mounted for rotation upon the massaging and exercising device.

A further specific object is to provide a massaging and exercising device the massaging and exercising elements or oppositely disposed, spherical surfaces of which will be mounted upon axes having angular relation to each other to cause portions of said spherical surfaces in advance of their axes to constantly move toward each other and portions of said spherical surfaces at the rear of their axes to constantly move away from each other when said surfaces are rolled or wiped over the skin.

And a still further specific object is to provide a massaging and exercising device including axes arranged in the same plane in divergent relation to each other, and massaging and exercising elements of spherical conformation rotatably mounted upon said axes and arranged opposite each other in suitable adjacent relation.

With the above objects in view, as well as others which will appear as the specification proceeds, the invention comprises the construction, arrangement and combination of parts as now to be fully described and as hereinafter to be specifically claimed.

Figure 2:
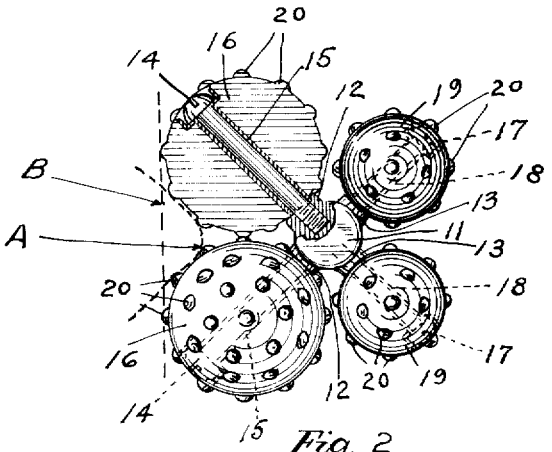
Figure 1:
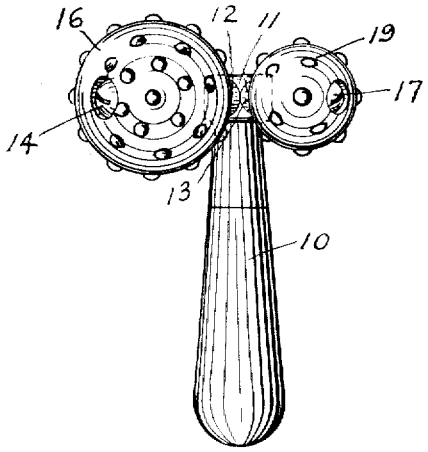
Figure 3:
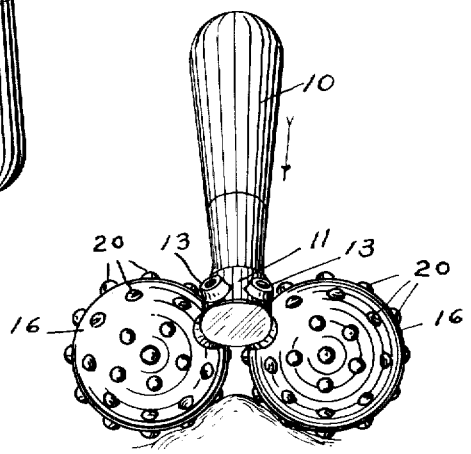

In the accompanying drawing forming a part of this specification, and wherein like reference characters represent similar parts throughout the several views, Fig. 1 is a side elevational view of a massaging and exercising device made according to the invention;

Fig. 2 is an end elevational view as seen from above in Fig. 1, the present view disclosing one of the spherical elements and the mounting therefor in section; and Fig. 3 is a perspective view, parts being omitted, showing the device applied to use.

With respect to the drawing and the numerals of reference thereon, the device comprises a body or support fashioned to be held in an operator's hand and consisting of a handle 10 carrying a head 11. The head 11 as shown includes four spaced apart bosses or lugs, designated 12 and 13, respectively, all in the same plane. The bosses or lugs 12, 13 are spaced about the perimeter of the head 12 preferably equidistantly, and are arranged, in the present instance, in approximately perpendicular relation to the handle 10. The two bosses or lugs indicated at 12 are arranged to receive axles 14 which, in the present instance, are headed screw bolts threaded into the bosses. Rotatably mounted on said axles are rollers 16 positioned so that their surfaces are closely adjacent, that is, near enough to each other to cause the flesh drawn by one of the rollers to react with the flesh drawn by the other roller. The rollers are of globose form and are preferably substantially spherical although they may vary therefrom. As shown herein, the rollers 16 are truly spherical in form and are made of resilient material. To permit the rollers to rotate freely on the axles regardless of any distortion of the rollers due to pressure, metallic bushings or hubs 15 are interposed between the resilient material of the rollers and the axles. Preferably, the angle between the axles 14 is approximately 90°. The other two bosses or lugs 13 are similarly threaded to receive axles or headed screw bolts 17 upon which rollers 19 are mounted with bushings or hubs 18 interposed therebetween to permit of free rotation. Each screw bolt 14, 17 is threaded into its corresponding boss or lug in the manner as very clearly shown in Fig. 2, and the outer ends of bushings 18 are of expanded cup shape to receive the heads of the screw bolts 14. Both said heads and cups are disposed within the perimeters of the spherical elements 16, 19, as is also clearly disclosed in said Fig. 2.

The spherical elements 16 are as disclosed larger than the spherical elements 19. Preferably, the larger spherical elements 16 are of relatively resilient nature, being composed of a good grade of rubber or rubber composition providing a surface which tends to adhere to and has a high coefficient of friction in engagement with the skin. The smaller spherical elements 19 are also desirably resilient, but are more rigid than the spherical elements 16. Said spherical elements 19 may be composed of a harder grade of rubber or rubber composition. Either set, or both sets, of elements 16, 19 may consist of some other material suitable to the purpose. Each element 16, 19 may desirably have thereon protuberances or humps 20.

In practice, the masseur holds the device by the handle 10 and presses the spherical elements of a set, such as 16 or 19, against the skin or flesh of the patient and propels the device along the skin or flesh. The spherical elements roll over the skin or flesh. When the handle is tilted to elevation causing portions of the oppositely disposed, spherical surfaces in advance of the axes of the spherical elements to engage the skin as the device is moved along, a pinching or contracting action is performed upon the skin and flesh, for the reason that portions of said spherical elements in advance of their axes and engaging the skin and flesh roll toward each other as the device is advanced, and since the rollers are closely adjacent, the portion of the flesh engaged by one roller reacts with the portion of the flesh engaged by the other and the flesh is forced up between the rollers. When the handle is tilted to elevation causing portions of the oppositely disposed, spherical surfaces at the rear of the axes of the spherical elements to engage the skin as the device is moved along, a spreading or expanding action is performed upon the skin and flesh, for the reason that portions of said spherical elements at the rear of their axes and engaging the skin and flesh roll away from each other as the device is advanced and the portions of the flesh engaged by the respective rollers are drawn in opposite directions. Hence, to accomplish pinching or contracting actions upon the skin and flesh, the handle 10 is tilted upwardly as the device is pushed forwardly and downwardly as the device is pulled rearwardly. To accomplish spreading or expanding actions, the reverse is the case, the handle being tilted downwardly as the device is pushed forwardly and upwardly as the device is pulled rearwardly. Thus, it will be seen, the device can be worked to and fro over the skin with portions of the opposite, spherical surfaces either in advance of or at the rear of the axes for said spherical surfaces engaged with the skin, as may be intentional, whereby to knead the skin and flesh and thus exercise the skin and flesh to stimulate the action thereof and arouse and increase the blood flow.

Obviously, the device can be employed by pressing adjacent spherical elements 16 and 19 of the different sets against the flesh.

It is to be particularly noted that the spherical elements 16, 19 apply the massaging and exercising actions to the skin and flesh in a smooth, gentle and effective manner, rolling evenly over the flesh while accomplishing the kneading thereof. The pinching or contracting and spreadinging or expanding actions can be as vigorously accomplished as may be desirable, depending upon the pressure applied to said spherical elements and against the skin and flesh.

In Figs. 2 and 3 the line A represents a portion of skin and flesh which has been pinched or contracted between the spherical elements 16 by action of the device, and in Fig. 2 the line B represents a portion of skin and flesh which has been spread or expanded by said spherical elements 16. In Fig. 3 the device is being moved in the general direction indicated by the arrow, or more strictly speaking in a direction perpendicular to the plane of the drawing.

From the above description it is seen that applicant has provided a very simple and efficient massaging and exercising device, and one which can be readily manipulated to perform very satisfactory massaging and exercising operations, the present device has been amply demonstrated in actual practice and found to be very successful and efficient.

It will of course be understood that various changes may be made in the form, details, arrangement and proportions of the parts, without departing from the scope of the invention, which, generally stated, consists in a device capable of carrying out the objects above set forth, and in the novel parts and combinations of parts disclosed and defined in the appended claims.

I claim as my invention:

1. A massaging device having in combination, a supporting head, a handle projecting therefrom, a pair of axles projecting from said head substantially at right angles to each other and substantially at right angles to the axis of said handle, spherical rollers of resilient material rotatably mounted on said axles, said rollers being of such size that the surfaces thereof are substantially in contact, whereby when said rollers are pressed and moved along the skin, a pinching action of the skin and flesh is effected.

2. A massaging device having in combination, a supporting head, a handle projecting therefrom, four axles projecting from said head substantially at right angles to each other and in a plane substantially at right angles to the axis of said handle, a pair of spherical rollers journaled on a pair of adjacent axles, said rollers being of such diameter, that their surfaces are substantially in contact, a pair of spherical rollers of much smaller diameter journaled on the other pair of axles with their surfaces spaced a short distance from each other, but substantially in contact with the surfaces of said larger rollers, whereby a pair of large rollers, a pair of small rollers, or a large and small roller may be simultaneously used and moved along the skin to suit the particular portion of the body being acted upon.

3. A massaging device having, in combination, a supporting head, a handle projecting therefrom, a pair of axles projecting from said head at an angle to each other not substantially greater than 90°, and spherical rollers of resilient material rotatably mounted on said axles, said rollers being of such size that the surfaces thereof are substantially in contact whereby, when said rollers are pressed and moved along the skin, a pinching action of the skin and flesh is effected.

4. A massaging device comprising, in combination, a support fashioned to be held in an operator's hand, a pair of balls of a material which is resilient and has a high coefficient of friction in engagement with the skin, means for journalling said balls on said support on axes at an angle to each other with the peripheries of the balls closely adjacent, the device as a whole being manipulable to produce varying effects of pinching and stretching on the part being treated by varying the inclination of the plane containing the axes of the balls relative to the surface being treated to cause the areas of contact of the balls with the surface to occupy a position forward or rearward of said plane containing the axes of the ball.

5. A massaging device comprising, in combination, a support fashioned to be held in an operator's hand, a pair of rollers of a material having a high coefficient of friction in engagement with the skin, means for journaling said rollers on said support at an angle to each other with the peripheries of the rollers closely adjacent, the rollers having a globose form whereby, when the device is manipulated, varying effects of pinching and stretching may be imparted to the surface being treated by varying the inclination of the plane containing the axes of the rollers relative to said surface to cause the areas of contact of the rollers with said surface to have a movement toward or away from each other.

PAUL L. HEMP.